United States Patent
Ogawa et al.

[11] Patent Number: 6,098,889
[45] Date of Patent: Aug. 8, 2000

[54] HYBRID INFORMATION RECORDING MEDIUM WITH MASKING LAYER

[75] Inventors: Yoshihiro Ogawa, Hachiohji; Mizuho Hiraoka, Kawasaki; Kazumi Nagano, Fujisawa; Hiroshi Tanabe, Yokohama, all of Japan

[73] Assignee: Canon Kabushiki Kaisha, Tokyo, Japan

[21] Appl. No.: 08/944,956

[22] Filed: Oct. 7, 1997

[30] Foreign Application Priority Data

Oct. 9, 1996 [JP] Japan .................................. 8-268378

[51] Int. Cl.$^7$ ...................................................... G06K 19/06
[52] U.S. Cl. ........................... 235/492; 235/488; 235/380; 235/487; 235/454; 902/22; 902/41; 902/26; 902/29
[58] Field of Search ..................................... 235/488, 380, 235/487, 492, 454; 902/22, 41, 26, 29

[56] References Cited

U.S. PATENT DOCUMENTS

| | | | |
|---|---|---|---|
| 4,719,140 | 1/1988 | Hara et al. | 428/138 |
| 4,879,153 | 11/1989 | Ohashi et al. | 428/76 |
| 4,990,759 | 2/1991 | Gloton et al. | 235/492 |
| 5,138,604 | 8/1992 | Umeda et al. | 369/103 |
| 5,208,450 | 5/1993 | Uenishi et al. | 235/492 |
| 5,224,090 | 6/1993 | Umeda et al. | 369/284 |
| 5,248,584 | 9/1993 | Miura et al. | 430/270 |
| 5,272,326 | 12/1993 | Fujita et al. | 235/487 |
| 5,332,890 | 7/1994 | Kitahara | 235/440 |
| 5,405,823 | 4/1995 | Fujimura et al. | 503/227 |
| 5,471,044 | 11/1995 | Hotta et al. | 235/487 |
| 5,547,915 | 8/1996 | Suzki et al. | 503/227 |
| 5,679,440 | 10/1997 | Kubota | 428/195 |
| 5,714,222 | 2/1998 | Yokoyama | 428/64.1 |
| 5,744,792 | 4/1998 | Imataki et al. | 235/492 |

FOREIGN PATENT DOCUMENTS

| | | |
|---|---|---|
| 61-103287 | 5/1986 | Japan . |
| 61-142551 | 6/1996 | Japan . |

OTHER PUBLICATIONS

Patent Abstracts of Japan, vol. 095, No. 009, JP 07–160839 (1995).
Patent Abstracts of Japan, vol. 096, No. 009, JP 08–115396 (1996).

*Primary Examiner*—Thien Minh Le
*Assistant Examiner*—Daniel S Felten
*Attorney, Agent, or Firm*—Fitzpatrick, Cella, Harper & Scinto

[57] ABSTRACT

An optical recording medium includes an integrated circuit (IC) module whose exposed surface is masked so as not to be visually recognized. The optical recording medium can be efficiently manufactured without degrading the essential function thereof. The optical recording medium includes a transparent substrate, an optical recording layer and a protective layer provided in this sequence. The IC module is buried in the optical recording medium so that one surface of the IC module is exposed on the protective layer. The optical recording medium also includes a hardened surface layer, transparent to a light beam for reproducing information recorded in the optical recording layer, or for reproducing information recorded in the optical recording layer and recording information in the optical recording layer, provided on a surface of the transparent substrate where the light beam is projected, and a masking layer provided in a region behind the IC module on the external surface of the hardened surface layer.

13 Claims, 4 Drawing Sheets

HYBRID INFORMATION RECORDING MEDIUM WITH MASKING LAYER

BACKGROUND OF THE INVENTION

1. Field of the Invention

This invention relates to an optical recording medium.

2. Description of the Related Art

Card-shaped information recording media having excellent portability, such as magnetic cards and the like, are now widely being used. Recently, IC (integrated circuit) cards, optical cards and the like have also been proposed as large-capacity memories. In addition, hybrid cards provided, as disclosed in Japanese Patent Laid-Open Application (Kokai) No. 61-103287 (1986), by combining and integrating respective information recording media, i.e., a magnetic memory, an optical recording portion and an IC memory, have been proposed. In a hybrid card provided by combining an optical memory and an IC memory, it is necessary to dispose an optical recording layer and an IC module, which constitute the respective memories, within a specific card size (85.6 mm long, 54 mm wide and 0.68–0.84 thick).

In order to simplify the configuration of a device for performing at least one of recording of information in each of the IC module and the optical recording layer, and reproducing of information recorded in each of the IC module and the optical recording layer, it is preferable to dispose the IC module and the optical recording layer so as to prevent the respective recording/reproducing means of the respective memory units from interfering with each other.

For example, as shown in FIG. 7, in an optical card in which an optical recording layer 2 and a protective layer 4 are provided on a transparent substrate 1 in this sequence, and a recording/reproducing beam 11 is projected from the side of the transparent substrate 1, it is preferable that the electrode surface of an IC module 7 is exposed on a surface of the protective layer 4 opposite to the surface where the recording/reproducing beam 11 is incident. However, when, for example, an IC module having a thickness of about 0.5 mm is buried in an optical card, the back surface of the IC module is visually recognized via the transparent substrate 1, thereby degrading, in some cases, the appearance of the optical card. In addition, interconnection portions of the IC module are, in some cases, exposed to the back surface of the IC module where they can be easily seen, increasing the difficulty of maintaining of information recorded in the IC module.

In order to solve such a problem, Japanese Patent Laid-Open Application (Kokai) No. 8-142551 (1996) has disclosed an idea of hiding the back surface of the IC module of an IC-incorporating optical card with a masking layer. In this application, it is disclosed that, when a masking layer is provided on an outer surface of a hardened surface layer provided at the side of the IC-incorporating optical card where light is incident, the masking layer has poor adhesion to the hardened surface layer. In order to solve this problem, there is disclosed an IC-incorporating optical card which includes, as shown in FIG. 8, an optical recording portion 81, an IC module 82, a masking layer 83, a card substrate 84, a transparent protective layer 85 and a hardened surface layer 86, and in which a portion of the hardened surface layer 86 behind the IC module 82 is cut and the masking layer 83 is provided at the cut portion in order to hide the back surface of the IC module 82. However, since a process to cut the hardened surface layer 86 is required for each IC-incorporating optical card disclosed in this application, the process for manufacturing the optical card is complicated, thereby increasing the production cost. Furthermore, there is the problem that, when the hardened surface layer 86 is cut, fine cracks are, in some cases, produced at end portions of the cut portion and spread when the optical card is bent. In addition, the surface of the hardened surface layer 86 is, in some cases, damaged during cutting or due to dust produced during cutting.

SUMMARY OF THE INVENTION

An object of the present invention is to provide an optical recording medium which comprises an integrated circuit (IC) module embedded therein and a masking layer for hiding the back surface of the IC module, and which can be efficiently manufactured without degrading the function of the optical recording medium even if the masking layer is provided.

According to one aspect of the present invention, there is provided an information recording medium comprising (a) a laminated structure comprising, in order:
   a first protective layer;
   an optical recording layer;
   an optical recording layer;
   a substrate; and
   a second protective layer, the substrate and the second protective layer being transparent to at least one of a beam for recording information to the optical recording layer and a beam for reproducing information stored in the optical recording layer;

(b) an IC module embedded into the laminated structure; and (c) a masking layer provided on an outer surface of the second protective layer so as to prevent the embedded IC module from being visually recognized from a second protective layer-side of the information recording medium.

The present invention also provides a masking layer having excellent adhesivess to the hardened surface layer.

The foregoing and other objects, advantages and features of the present invention will become more apparent from the following detailed description of the invention taken in conjunction with the accompanying drawings.

DETAILED DESCRIPTION OF THE INVENTION

First Embodiment

Figure 1:
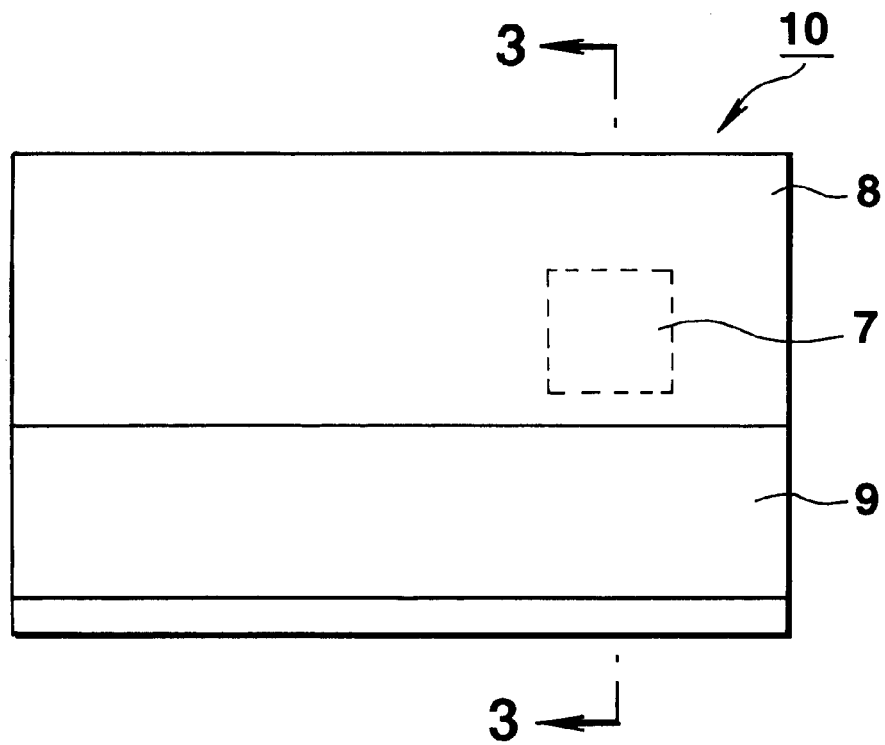
FIG. 1 is a schematic plan view illustrating a side of an IC-incorporating optical card where a hardened surface layer is provided according to a first embodiment of the present invention.
Figure 2:
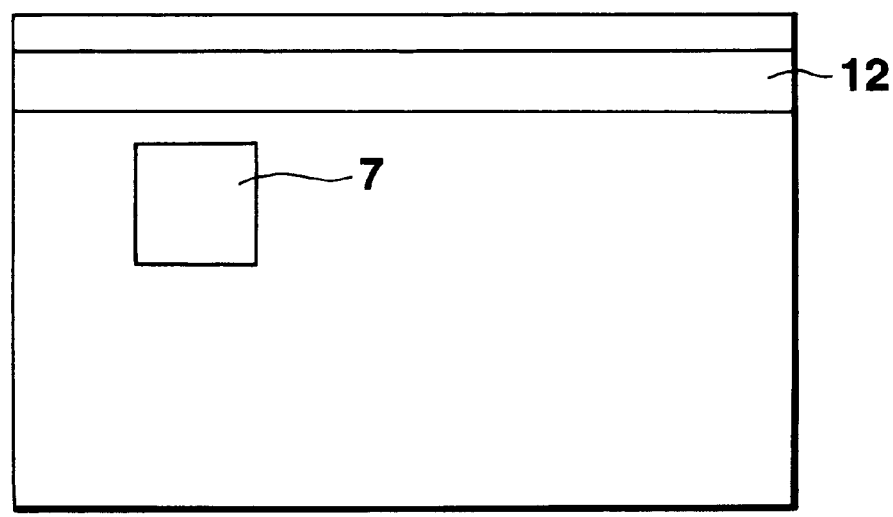
FIG. 2 is a plan view illustrating a side of the IC-incorporating optical card shown in FIG. 1 where an IC module is exposed.
Figure 3:
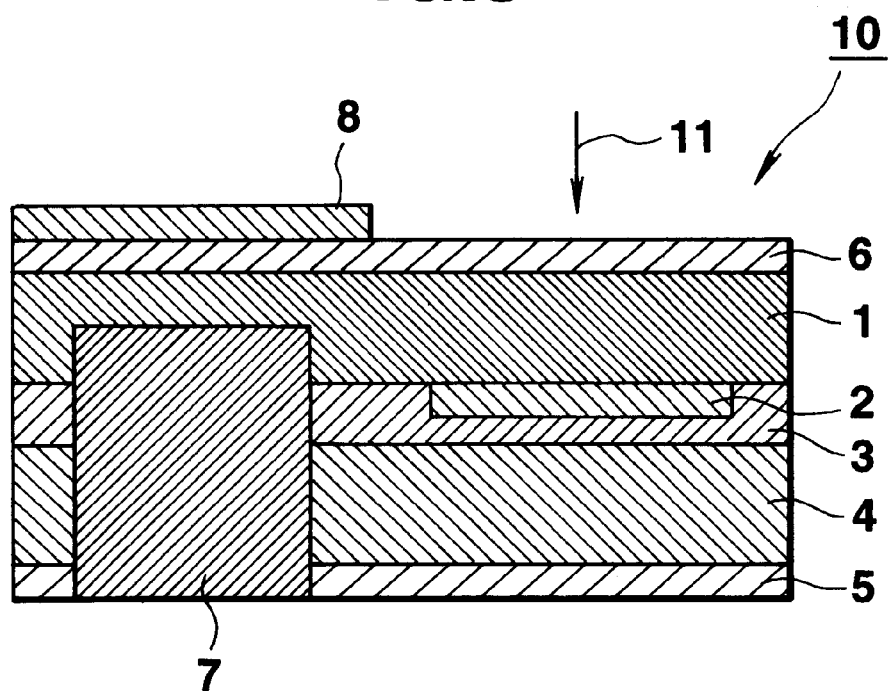
FIG. 3 is a cross-sectional view of the IC-incorporating optical card taken along line 3—3 shown in FIG. 1.

In FIGS. 1 through 3, there are shown a transparent substrate 1 having a preformatted pattern, an optical recording layer 2, an adhesive layer 3, a first protective layer 4, a visual-information layer 5 having visual information and the like formed on a surface thereof, a hardened surface layer as a second protective layer 6, an IC module 7, a masking layer 8, and an optical recording region 9 in the optical-information recording layer 2 where information is to be actually recorded or optical information to be reproduced is recorded.

Masking layer 8

The masking layer 8 is a printed layer formed on the external surface of the hardened surface layer 6 by printing a printing ink, and the masking layer is for preventing the embedded IC module 7 from being visually recognized through the transparent substrate 1.

Various contradictory characteristics are required for the masking layer 8. That is, a high masking capability is required for the masking layer 8. More specifically, in order to completely hide the IC module, it is preferable that the transmittance of the masking layer 8 for visible light (having, for example, wavelengths of 400–700 nm) is equal to or less than 2%. The masking layer 8 is preferably thin so as not to influence the thickness of the entire optical recording medium. It is necessary to suppress the entire thickness of the optical card to about 0.68–0.84 mm, and the thickness of the masking layer 8 is preferably 3–30 $\mu$m, more preferably equal to or less than 15 $\mu$m, and still more preferably, equal to or less than 10 $\mu$m. In order to provide a masking layer having a thin layer with a high masking ability, it is preferable to include a larger amount of pigment, dye or the like in the layer. In this case, however, the adhesion of the masking layer to the hardened surface layer is degraded, and there is the possibility that the masking layer itself will become fragile. Particularly when the masking layer 8 is exposed on the surface of the optical recording medium, adhesion of the masking layer 8 to the hardened surface layer or fragility of the masking layer itself is disadvantageous. Hence, it is important when providing a masking layer 8 on the optical recording medium to balance various contradictory factors.

Under these circumstances, the inventors of the present invention have found as a result of various studies that a masking layer having a sufficient masking ability even if it is thin and having excellent adhesiveness to the hardened surface layer can be formed by using, for example, printing ink. When, for example, the hardened surface layer 6 comprises a photo-cured urethane-modified acrylic resin, a two-component curable liquid urethane acrylate ink is preferably employed as a material for the masking layer. Two-component curable liquid urethane acrylate type ink mainly comprises two components, one of which is an acrylpolyol resin as a main agent, and another is an isocyanate resin as a curing agent. The mixing ratio of the main agent and the curing agent is preferably controlled such that unreacted hydroxyl groups from the acrylpolyol are not present in a urethane acrylate resin resulting from a thermal cross-linking reaction or a photo cross-linking reaction between the acrylpolyol resin and the isocyanate resin in an unreacted state. That is to say, the mixing ratio is preferably controlled so that the number of equivalents of the isocyanate group, serving as the reactive site of isocyanate resin, is larger than the number of equivalents of the hydroxyl group of the acrylpolyol. Further, main agent of the two-component curable liquid urethane acrylate type ink may include, for example, 20–50 weight % of acrylpolyol resin, 0–10 weight % of vinyl chloride resin, 5–20 weight % of aromatic hydrocarbon solvents, 15–30 weight % of ketone solvents, 5–15 weight % of glycol solvents, 10–35 weight % of pigment, and 1–5 weight % of additives, such as a leveling agent and the like.

In case of using a solvent for two-component curable liquid urethane acrylate ink which is compatible with the hardened surface layer, the masking layer shows excellent adhesiveness to the hardened surface layer. In this ink, even if a relatively large amount of pigment/dye is added in order to improve masking ability, the adhesiveness of the obtained masking layer to the hardened surface layer, and the strength of the obtained masking layer itself are not greatly degraded. Hence, this ink is suitable as a material for the masking layer. In the case that the percentage content of the pigment or dye in the masking layer is 30–80 weight %, particularly 30–60 weight %, a transmittance of the masking layer for visible light is equal to or less than 2% even if the thickness of the masking layer is 3–30 $\mu$m, and the adhesiveness to the hardened surface layer and the strength of the masking layer itself are also excellent.

If the pigment within the masking layer has a flattened, or "flaky" shape, transmission of light can be effectively prevented by superposition of the pigment flakes. Thus, a masking layer having superior masking ability can be obtained even if the percentage content of the pigment in the masking layer is relatively small. Flattened pigment particles having a maximum dimension of 3–10 $\mu$m can provide a higher masking effect within the above-described range of the thickness of the masking layer. For example, a masking layer having 10 $\mu$m thickness, and containing 40–70 weight % of flaky shape pigment particles having a maximum dimension of 3 $\mu$m has a light transmittance of 0.1%, and does not peel from the hardened surface layer comprising urethane acrylate.

Figure 6:
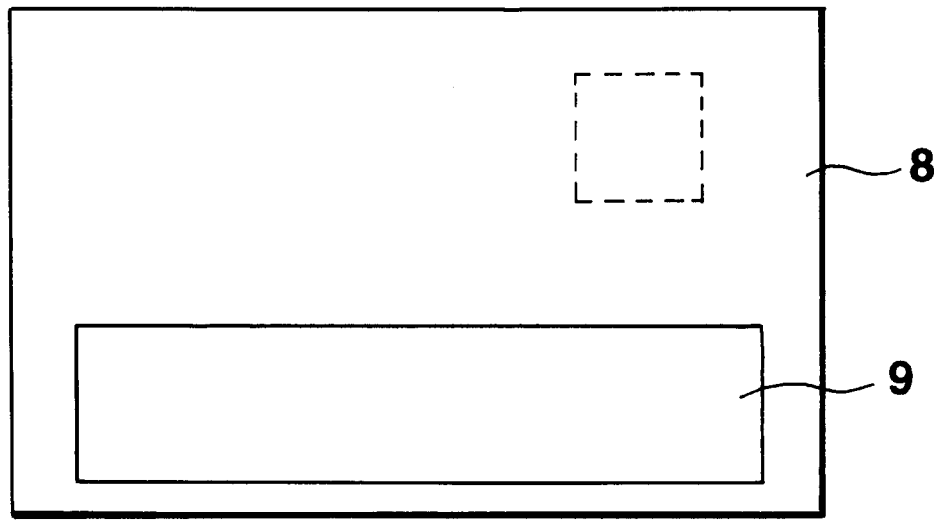
FIG. 6 is a schematic plan view illustrating a side of another IC-incorporating optical card where a hardened surface layer is provided according to the first embodiment.
Figure 7:
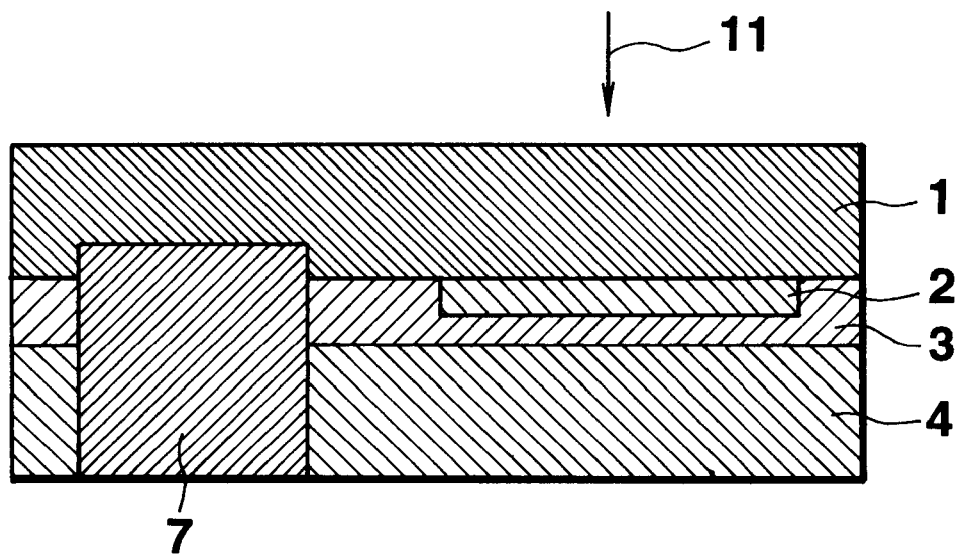
FIG. 7 is a schematic cross-sectional view illustrating the general configuration of a hybrid card.
Figure 8:
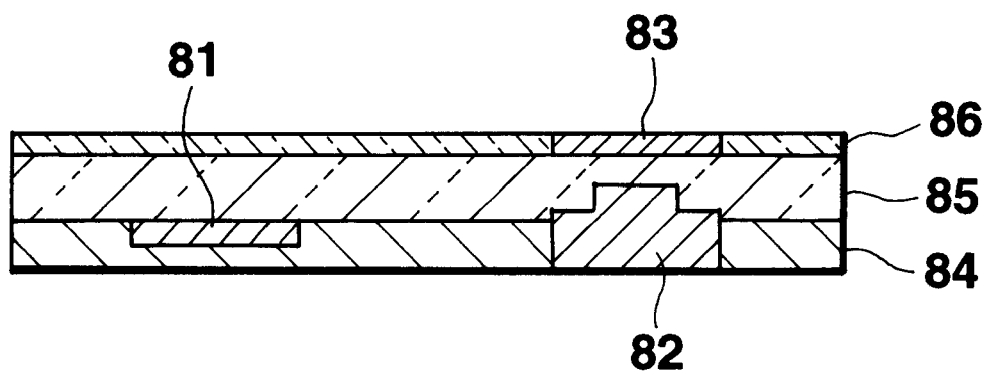
FIG. 8 is a schematic cross-sectional view illustrating a conventional hybrid card including a masking layer.

The masking layer 8 may be formed on the hardened surface layer by employing conventional printing methods, such as screen printing or the like. The masking layer 8 may be formed on a region of the hardened surface layer where the IC module is hidden. For example, as shown in FIG. 6, the masking layer 8 may also be provided over the entire surface except the optical recording region. At least one kind of information selected from a group consisting of each kind of design printing, a figure photograph, initializing information, bar codes, OCR (optical character recognition) characters, a hologram and a signature panel may also be provided on the surface of the masking layer 8. In order to achieve at least one of the protection of the surface of the masking layer 8, and the protection of the above-described various kinds of information which may be provided on the surface of the masking layer 8, a third transparent protective layer may be provided on the outer surface of the masking layer 8.

The masking layer 8 is directly formed on the outer surface of the hardened surface layer so as to hide the IC module.

Hardened surface layer 6

The hardened surface layer 6 protects the optical-card substrate 1 from scratches and dust which may cause recording error or reproducing error. The hardened surface layer preferably has hardness equivalent to a pencil hardness of 5 H or more. In addition, in case of performing a steel-wool test, that is, pressing #-1000 steel wool on the hardened surface layer of the information recording medium with a weight of 100 g/cm$^2$ and then moving the medium reciprocally en times, the number of 1 μm-width, 10 μm-long scratch on the hardened surface layer is preferably less than 20/mm². It is preferable that projections and recesses which influence recording and reproducing operations are minimized. Since the optical card is always carried for use, the optical card may be bent while being used. It is preferable that a crack is not produced in the hardened surface layer even in such a case. More specifically, it is preferable that, for example, no crack and destruction occur after 1000 bending operations under conditions of 250 bending tests of 20 mm for the longer side and 10 mm for the shorter side of the optical card for each surface of the information recording medium with a frequency of 30 times/min.

Examples of a material for the hardened surface layer include photo-curable urethane modified acrylic oligomer, that is, acrylic oligomer having a uerthane bond in the molecule, and capable of polymerizing by irradiating light due to breakage of double bond of acrylic group. In addition, melamine resin, silicone resin and epoxy resin may be used. Further, in order to increase the hardness of the hardened surface layer, a lubricant, such as silicone etc. may also be contained in the hardened surface layer.

Substrate 1

As the substrate 1, any material which is transparent to the recording and/or allows optical recording and reproducing beam, and which can be cut in order to embed an IC module, may be used. For example, plastics, such as polycarbonate, polyvinyl chloride, polymethyl methacrylate and the like, may be used.

Optical recording layer 2

As the optical recording layer 3, any material which provides a recording layer capable of recording and/or erasing information and can be recorded, reproduced and erased by a laser beam may be used. For example, organic-dye recording materials and metallic recording materials may be used. Other layers, such as a reflecting layer, an undercoated layer and the like, may also be provided.

Adhesive layer 3

For the adhesive layer 3, a conventional adhesive agent may be used. Examples for the adhesive agents include polymers and copolymers of vinyl monomers, such as vinyl acetate, acrylic ester, vinyl chloride, ethylene, acrylic acid, acrylamide and the like, thermoplastic adhesives comprising polyamide, polyester, epoxy or the like, thermosetting adhesives comprising amino resin (urea resin, melamine resin), phenol resin, epoxy resin, urethane resin, vinyl resin or the like, rubber adhesives comprising natural rubber, nitrile rubber, chloro rubber, silicone rubber or the like.

Protective substrate 4

Any material which can mechanically and chemically protect the optical recording layer and which allows cutting for embedding an IC module may be used. Particularly, a plastic material is preferred. The visual-information layer (card printed layer) 5 may be provided on one surface of the protective substrate 4. Any information provided in an ordinary credit card or the like, such as design printing of the card, a figure photograph, initializing information relating to the card's owner, bar codes, characters which can be optically recognized (OCR characters), a hologram, a signature panel or the like, may be provided as the card printed layer 5. If necessary, an overcoating layer may be provided on the surface of the card printed layer, i.e., the outermost layer of the card.

A magnetic stripe 12, serving as a magnetic memory, may also be provided on at least one surface of the hardended surface layer 6 or the protective layer 4. Information recorded in the IC module, information recorded in the optical recording portion, and information recorded in the magnetic stripe may be recorded/reproduced in a correlated manner.

Second Embodiment

Figure 4:
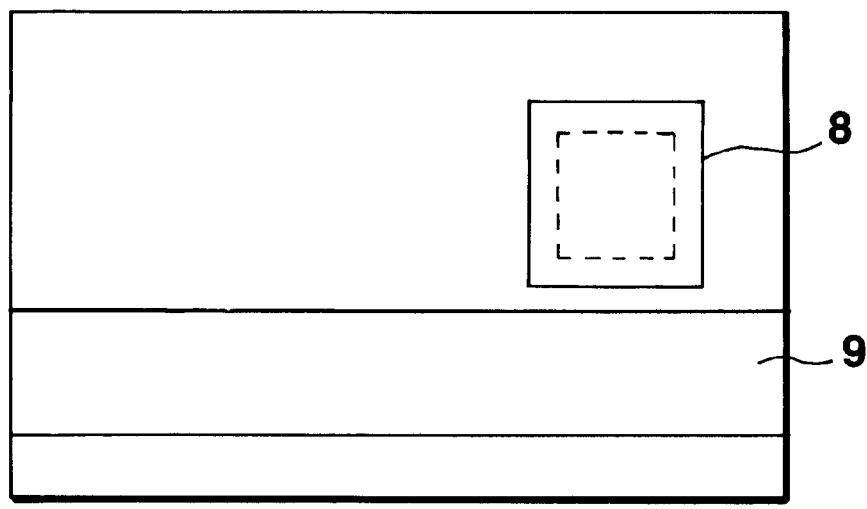
FIG. 4 is a schematic plan view illustrating a side of an IC-incorporating optical card where a hardened surface layer is provided according to a second embodiment of the present invention.
Figure 5:
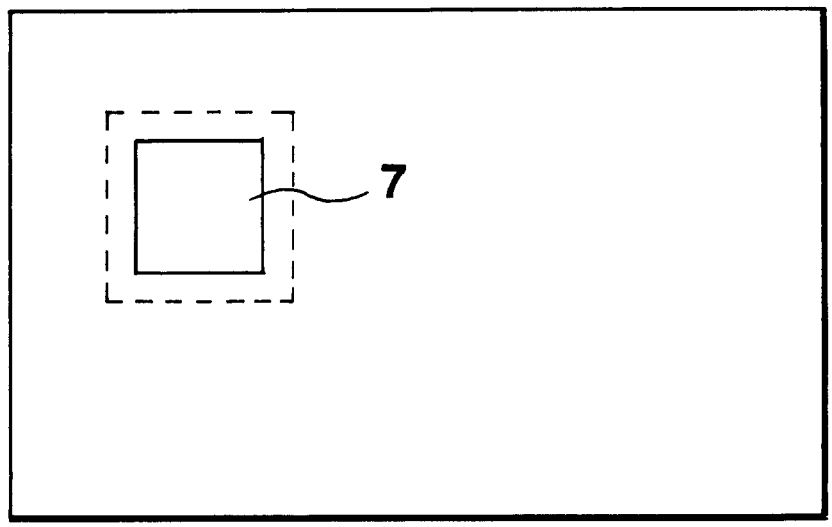
FIG. 5 is a schematic plan view illustrating a side of the IC-incorporating optical card shown in FIG. 4 where an IC module is exposed.

FIG. 4 is a plan view illustrating a surface of an optical card according to a second embodiment of the present invention, the surface being irradiated by the recording/reproducing beam. FIG. 5 is a plan view illustrating the opposite surface of the optical card shown in FIG. 4. This configuration differs from that of the first embodiment in that the masking layer 8 is provided only on the minimum area necessary to hide the IC module on the hardened surface layer so that the IC module is not visually recognized.

A number of embodiments of the information recording medium in accordance with the invention, together with their methods of production will now be described in more detail with reference to the following examples.

EXAMPLE 1

The information recording medium shown in FIGS. 1–3 was prepared by the following steps. The polycarbonate transparent substrate (1) having dimensions 100 mm width, 100 mm length, 0.4 mm thickness was prepared. The transparent substrate was provided with a transparent hardened surface layer as a second protective layer on the surface by coating photo-curable urethane-modified acrylic oligomer (trade name: UNIDIC 17-824-9 manufactured by DAINIPPON INK & CHEMICALS Inc.) and photocuring.

0.1 μm thickness of an optical recording layer (2) was formed on another surface of the transparent substrate by wel-coating of 1,1,5,5-tetrakis (p-diethylaminophenyl)-2,4-pentadienium perchlorate at a concentration of 3 wt % in diacetonalcohol, and dried.

A first protective layer was prepared by the following steps. The polycarbonate transparent plate provided with design-printed layer on the surface thereof, having dimensions 100 mm width, 100 mm length, 0.25 mm thickness was prepared. A 40 μm thickness of polyvinyl chloride sheet (trade name: GENOTHERM ZE84 manufactured by Hoechst) was laminated on the design-printed layer and the polyvinyl chloride sheet was bonded to the design-printed layer by hot-pressing at 140° C.

Then, the obtained transparent substrate and the obtained first protective substrate were laminated so that the optical recording layer was opposed to the surface of the first protective layer on which the polyvinyl chloride sheet was not provided, between which a hot melt type adhesive agent (trade name: O-4121 manufactured by KURABOU Co. Ltd.) was provided, adhering the transparent substrate to the first protective substrate. Next, on the outer surface of the hardened surface layer, a masking layer (8) in 10 μm thickness was formed by applying in screen printing method with mesh-2000 screen, two-component curable liquid urethane acrylic type ink (trade name: KAC INK MEDIUM manufactured by SEIKO ADVANCE Co. Ltd.) into which black pigment whose average particle size was 5 μm (No. 710 manufactured by SEIKO ADVANCE Co. Ltd.) was dispersed, and into which curing agent for HAC INK manufactured by SEIKO ADVANCE Co. Ltd. was added. The mixing ratio of the ink, the pigment and the curing agent was 10:3:1. The masking layer was provided in stripe shape so that an IC module to be provided later was hidden from the second protective layer-side of the information recording medium. Then the laminated structure was cut to obtain an optical card.

Next, a hole for embedding an IC module was made in the optical card. The hole was dug from the side of the design-printed layer of the optical card. The maximum depth of the hole was 0.66 mm. Into the hole, an IC module whose thickness is about 0.66 mm was provided and bonded with an adhesive agent, providing a hybrid card.

When the obtained hybrid card was visually observed from the side of the hardened surface layer (8) under a C light source as a standard light source which is standardized under Japanese Industrial Standard (JIS) Z-8720, the IC module was not visually recognized.

The masking layer used in this example was separately formed on a transparent polycarbonate plate. The transmittance of the masking layer for visible light via the polycarbonate plate measured using a spectrophotometer (trade name: MCPD-1000 made by Otsuka Denshi Kabushiki Kaisha) was 1.5%. The adhesiveness of the masking layer formed on the hardened surface layer was evaluated according to a peeling test defined by ISO (International Organization for Standardization/IEC (International Electrotechnical Commission) 10373 5.7, and no peeling of the masking layer was observed. The percentage content of the pigment within the masking layer was 63 weight %.

EXAMPLE 2

A hybrid card was obtained in the same manner as in Example 1 except that the masking mayer in 7 µm thickness was formed by applying in screen printing method with mesh-225 screen, two-component curable liquid urethane acrylate type ink (trade name: HAC INK (medium) manufactured by SEIKO ADVANCE Co. Ltd.) into which silver-colored pigment in the form of flakes whose average particle size was 3 µm (No. 606A manufactured by SEIKO ADVANCE Co. Ltd.) was dispersed, and into which curing agent for HAC INK manufactured by SEIKO ADVANCE Co. Ltd.) was added. The mixing ratio of the ink, the pigment and the curing agent was 10:3:1.

The obtained hybrid card was visually observed in the same manner as in Example 1, and the IC module was not visually recognized. Further, the transmittance for visible light of masking layer was not higher than 2%. Furthermore, the adhesiveness of the masking layer was evaluated in the same manner as in Example 1, and no peeling was observed.

The percentage content of the pigment in the masking layer was 63 wt %.

COMPARATIVE EXAMPLE 1

A hybrid card was obtained in the same manner as in Example 1 except that a vinyl polyester resin (trade name: SG700 (medium) manufactured by SEIKO ADVANCE Co. Ltd.) was used instead of the HAC ink (medium) in the ink for forming the masking layer. The obtained masking layer was subjected to a peeling test in the same manner as in Example 1. Peeling occurred in 52 samples from among 100 samples, and the adhesiveness was not excellent.

COMPARATIVE EXAMPLE 2

A hybrid card was obtained in the same manner as in Example 2 except that a silver-colored pigment in the form of flakes (trade name: 606H manufactured by SEIKO ADVANCE Co. Ltd.) having an average maximum dimension of 30 µm was used. The transmittance for visible light measured in the same manner as in Example 1 was 32%. When the hybrid card was observed from the side of the hardened surface layer, the IC module was visually recognized.

EXAMPLE 3

A hybrid card was obtained in the same manner as in Example 2. Then, on the outer surface of the hardened surface layer, a third transparent protective layer was provided by applying two-component curable liquid urethane acrylate type ink (trade name: HAC INK (medium) manufactured by SEIKO ADVANCE Co. Ltd.) into which a curing agent for HAC INK, and matting agent (extender) were added, and curing and drying for 1 hour at 80° C. The mixing ratio of HAC INK, the curing agent and the matting agent was 10:1.5:0.5.

Since the masking layer was protected by the third protective layer, the masking layer was wear-resistant.

As described above, according to the present invention, a masking layer for an IC module can be provided on a hardened surface layer. Since a printed layer is provided without peeling the hardened surface layer, an inexpensive optical recording medium is provided without generating dust. As a result, the failure rate of the optical recording medium is reduced, and the production time period can also be reduced.

The individual components shown in outline in the drawings are all well-known in the optical recording medium art and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information recording medium comprising:
   (a) a laminated structure comprising, in order:
      a first protective layer;
      an optical recording layer;
      a substrate; and
      a second protective layer, the substrate and the second protective layer being transparent to at least one of a beam for recording information to the optical recording layer and a beam for reproducing information stored in the optical recording layer;
   (b) an integrated circuit module embedded into the laminated structure; and
   (c) a masking layer provided on an outer surface of the second protective layer so as to prevent the embedded integrated circuit module from being visually recognized from a second protective layer side of the information recording medium, wherein the masking layer comprises a pigment that comprises flattened particles having a maximum dimension of from 3 to 10 µm.

2. The information recording medium according to claim 1, wherein transmittance of the masking layer for visible light is not more than 2%.

3. The information recording medium according to claim 1, wherein thickness of the masking layer is from 3 to 30 µm.

4. The information recording medium according to claim 3, wherein thickness of the masking layer is from 3 to 15 µm.

5. The information recording medium according to claim 4, wherein thickness of the masking layer is from 3 to 10 µm.

6. The information recording medium according to claim 3, wherein the masking layer comprises a urethane acrylate compound.

7. The information recording medium according to claim 6, wherein the urethane acrylate is made by reacting an acrylpolyol with an isocyanate.

8. The information recording medium according to claim 1, wherein the masking layer further comprises a dye.

9. The information recording medium according to claim 8, wherein the masking layer comprises from 30–80 wt % of the dye and pigment.

10. The information recording medium according to claim 1, wherein the masking layer is provided on the outer surface of the second protective layer except an area which overlaps with an area where the optical recording layer is provided.

11. The information recording medium according to claim 1, wherein the integrated circuit module is embedded into the first protective layer so that a surface of the integrated circuit module is exposed at an outer surface of the first protective layer.

12. The information recording medium according to claim 1, wherein the second protective layer comprises photo-cured urethane-modified acrylic resin compound.

13. The information recording medium according to claim 1, wherein the masking layer comprises from 30–80 wt % of the pigment.

* * * * *